(12) United States Patent
Smith et al.

(10) Patent No.: US 11,258,518 B2
(45) Date of Patent: *Feb. 22, 2022

(54) CIRCUIT FOR MULTI-PATH INTERFERENCE MITIGATION IN AN OPTICAL COMMUNICATION SYSTEM

(71) Applicant: MARVELL ASIA PTE, LTD., Singapore (SG)

(72) Inventors: Benjamin P. Smith, Ottawa (CA); Jamal Riani, Fremont, CA (US); Sudeep Bhoja, San Jose, CA (US); Arash Farhoodfar, San Jose, CA (US); Vipul Bhatt, Los Altos, CA (US)

(73) Assignee: MARVELL ASIA PTE LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/951,653

(22) Filed: Nov. 18, 2020

(65) Prior Publication Data

US 2021/0075516 A1  Mar. 11, 2021

Related U.S. Application Data

(63) Continuation of application No. 16/790,463, filed on Feb. 13, 2020, now Pat. No. 10,880,015, which is a continuation of application No. 16/259,760, filed on Jan. 28, 2019, now Pat. No. 10,601,518, which is a continuation of application No. 15/836,603, filed on Dec. 8, 2017, now Pat. No. 10,236,994, which is a (Continued)

(51) Int. Cl.
*H04B 10/69* (2013.01)
*H04B 10/58* (2013.01)
*H04B 10/2507* (2013.01)
*H04B 10/54* (2013.01)
*H04B 10/516* (2013.01)
*H04B 10/00* (2013.01)

(52) U.S. Cl.
CPC ............. *H04B 10/58* (2013.01); *H04B 10/00* (2013.01); *H04B 10/2507* (2013.01); *H04B 10/25073* (2013.01); *H04B 10/5161* (2013.01); *H04B 10/541* (2013.01); *H04B 10/697* (2013.01); *H04B 10/6971* (2013.01)

(58) Field of Classification Search
None
See application file for complete search history.

(56) References Cited

U.S. PATENT DOCUMENTS 5,999,258 A * 12/1999 Roberts ............ H04B 10/07951
356/450
6,067,180 A *  5/2000 Roberts ............ H04B 10/25133
398/1
9,571,205 B1 *  2/2017 Suarez ................... H04B 1/525
(Continued)

*Primary Examiner* — Li Liu

(57) ABSTRACT

A circuit and method for mitigating multi-path interference in direct detection optical systems is provided. Samples of an optical signal having a pulse amplitude modulated (PAM) E-field are processed by generating a PAM level for each sample. For each sample, the sample is subtracted from the respective PAM level to generate a corresponding error sample. The error samples are lowpass filtered to produce estimates of multi-path interference (MPI). For each sample, one of the estimates of MPI is combined with the sample to produce an interference-mitigated sample.

20 Claims, 6 Drawing Sheets

Related U.S. Application Data continuation of application No. 15/040,812, filed on Feb. 10, 2016, now Pat. No. 9,876,581.

(56) References Cited

U.S. PATENT DOCUMENTS

| | | | | |
|---|---|---|---|---|
| 2002/0089947 | A1* | 7/2002 | Holtzman | H04L 1/1887 370/328 |
| 2003/0169427 | A1* | 9/2003 | Muro | H04B 10/503 356/450 |
| 2004/0028121 | A1* | 2/2004 | Fitton | H04B 1/7107 375/144 |
| 2007/0223565 | A1* | 9/2007 | Gaal | H04B 1/71075 375/141 |
| 2010/0160555 | A1* | 6/2010 | Tanaka | C08J 5/24 524/876 |
| 2013/0230311 | A1* | 9/2013 | Bai | H04B 10/2507 398/9 |
| 2014/0308046 | A1* | 10/2014 | Bliss | H04B 10/697 398/147 |
| 2014/0348512 | A1* | 11/2014 | Chaahoub | H04B 10/801 398/139 |
| 2016/0154175 | A1* | 6/2016 | Downie | H04B 10/2507 398/144 |

\* cited by examiner

CIRCUIT FOR MULTI-PATH INTERFERENCE MITIGATION IN AN OPTICAL COMMUNICATION SYSTEM

CROSS-REFERENCE

The present application is a continuation of U.S. application Ser. No. 16/790,463 filed Feb. 13, 2020, which is a continuation of U.S. application Ser. No. 16/259,760 filed Jan. 28, 2019, now U.S. patent Ser. No. 10/601,518 issued Mar. 24, 2020, which is a continuation of U.S. application Ser. No. 15/836,603 filed Dec. 8, 2017, now U.S. Pat. No. 10,236,994 issued Mar. 19, 2019, which is a continuation of U.S. application Ser. No. 15/040,812 filed Feb. 10, 2016, now U.S. Pat. No. 9,876,581 issued Jan. 23, 2018, the contents of which are incorporated by reference herein in the entirety.

FIELD

The application relates to systems and methods for mitigating interference in an optical communications system.

BACKGROUND

In a direct-detected optical communications system, multi-path interference (MPI) originates from combinations of reflections of a transmitted waveform at optical interfaces (connectors, receiver/transmitter interfaces). An example is depicted in FIG. 1 which shows a transmitter 100 connected to a receiver 102 over a sequence of optical cables connected at optical interfaces 104,106,108. After transmission of a signal s(t) by transmitter 100, due to reflections at the interfaces 104,106,108, a signal u(t) received at receiver 102 is the sum of a set of delayed replicas of a transmitted signal. Generally indicated at 110 is a logically equivalent version of the system of FIG. 1 showing the summing of four delayed components, with respective attenuations $a_1$, $a_2$, $a_3$, $a_4$.

Another source of the interference is due to reflections that occur in the electrical domain, for example after a photodiode in the receiver, or prior to a laser modulator in the transmitter. These electrical reflections can be cancelled directly, by estimating the delay and amplitude of each component. Such electrical reflections typically occur over very short distances (on the order of tens of mm or less), so they remain within a small number of bauds from the main signal.

BRIEF DESCRIPTION OF THE DRAWINGS

Embodiments of the disclosure will now be described with reference to the attached drawings in which.

DETAILED DESCRIPTION

As mentioned in the background section, interference due to reflections that occur in the electrical domain can be cancelled directly, by estimating the delay and amplitude of each component, because the electrical reflections typically occur over very short distances (~mm), so they remain within a small number of bauds from the main signal. Traditional approaches to interference cancellation explicitly cancel the individually reflected terms (for example using a decision-feedback equalizer). This approach is challenging to apply to MPI, since the reflections may be delayed by many 1000s of bauds, and the size and location of the taps may vary as a function of time, for example due to mechanical vibrations and laser phase variation. It is very challenging to make the adaptation loops sufficiently fast, and a large amount of memory is required to store past decisions.

In addition, the impact of MPI is level-dependent for direct-detection receivers, i.e., a receiver that detects power of optical waveform. More specifically, in a multi-level modulation schemes such as pulse amplitude modulation (PAM), the effect of MPI is larger for larger PAM levels than for smaller PAM levels.

According to one aspect of the present invention, there is provided a method of processing a plurality of samples of an optical signal having a pulse amplitude modulated (PAM) E-field, the method comprising: for each sample, estimating a respective PAM level; for each sample, subtracting the sample from the respective PAM level to generate a corresponding error sample; low-pass filtering the error samples to produce estimates of multi-path interference (MPI); for each sample, combining one of the estimates of MPI with the sample to produce an interference-mitigated sample.

According to another aspect of the present invention, there is provided a circuit for processing a plurality of samples of an optical signal having a pulse amplitude modulated (PAM) E-field, the circuit comprising: a slicer that, for each sample, estimates a respective PAM level of the sample; a subtractor that, for each sample, subtracts the sample from the respective PAM level to generate a corresponding error sample; a low-pass filter that filters the error samples to produce estimates of multi-path interference (MPI); a combiner that for each sample, combines one of the estimates of MPI with the sample to produce an interference-mitigated sample.

Figure 2:
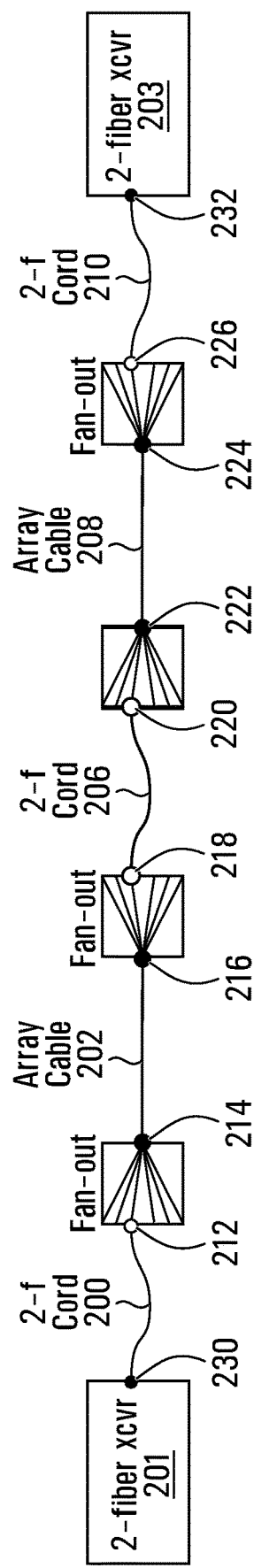
FIG. 2 is another example of an optical system having connectors with differing return losses.
Figure 3:
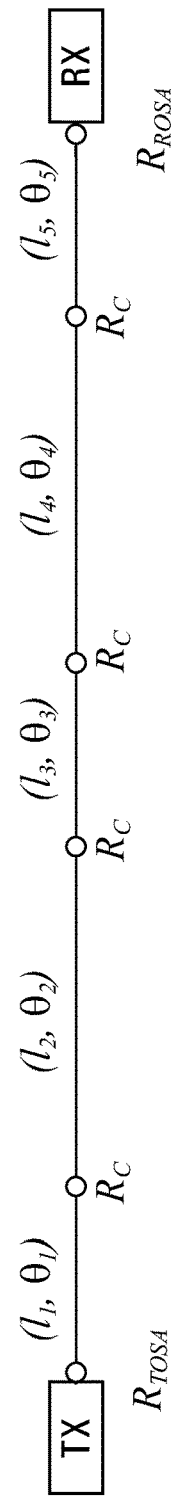
FIG. 3 is a multi-path channel model for the optical system of FIG. 2

An example of an optical communications system is depicted in FIG. 2. This example includes a first transceiver 201 having a transmit optical subassembly (TOSA) connector 230 and a second transceiver 204 having a receive optical subassembly (ROSA) connector 232. The two transceivers 201,204 are connected by an optical path having five sections of cable 200,202,206,208,210, and connectors 212, 214,216,218,220,222,224,226. In a typical optical communications systems, there will be connectors having different qualities. In FIG. 2, the connectors 214,216,222,224 have excellent return loss compared to the other connectors. The system can be modelled using a multi-path channel model such as depicted in FIG. 3 where the connectors with excellent return loss have been abstracted out as they do not make a significant contribution to MPI. For this specific example, the five physical lengths of cabling having lengths $l_i$. The model includes interfaces at the four relatively poorer return loss connectors plus at the TOSA connector and the ROSA connector. It should be understood that the approach generalizes to an arbitrary number of connectors and cables.

Each connector has an associated return loss. Each length of cable has an associated phase shift $\theta_i$ which relates to link-induced phase randomization (relative to main signal, also referred to herein as the interference victim, or simply victim) of interferers.

Figure 4:
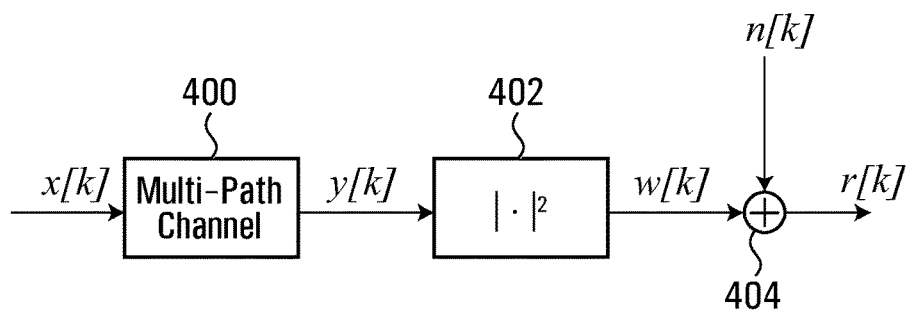
FIG. 4 is a block diagram of a baud rate system model.

A baud rate system model based on the system of FIG. 2 (but again, more generally upon a system with any number of connectors and cables) is depicted in FIG. 4. In this model, an input sample x[k] is transmitted over a multi-path channel which transforms the input sample x[k] into y[k]. Direct detection upon y[k] is performed at 402 to produce w[k]. A noise contribution n[k] is added at 404 to produce a received sample r[k]. The complex baseband representation of the input sample x[k] can be modelled according to:

$$x[k]=A[k]e^{j\phi[k]}$$

Where A[k] is the PAM level for the input sample x[k], and is one of a set of PAM levels according to the PAM modulation scheme and $\phi[k]$ is the phase for input sample x[k].

In addition, y[k], r[k], and the MPI interference component can be modelled according to:

$$y[k]=A[k]e^{j(\phi[k]+\Sigma_{[v]}{}^0\theta_l)}+\Sigma_m\gamma_m A[k-d_m]e^{j(\phi[k-d_m]+\Sigma_{[v]}{}^0\theta_{l+}\phi[m])}$$

$$r[k]\approx|A[k]|^2+2|A[k]|\Sigma_m\gamma_m|A[k-d_m]|\cos(\phi[k]-\phi[k-d_m]+\psi[m])+n[k]$$

MPI Interference: $2|A[k]|\Sigma_m\gamma_m|A[k-d_m]|\cos(\phi[k]-\phi[k-d_m]+\psi[m])$ For the purpose of this model, it is assumed that:
the phase of the transmitted signal varies according to a random walk, where
$\phi[k]-\phi[k-1]=\rho[l]$, where $\rho[l]$ is a zero-mean Gaussian random variable with variance $\sigma^2=2\pi\Delta v l T_B$, where $\Delta v$ is the 3-dB line-width of the laser, and $T_B$ is the baud-period of the signal;
$d_m$ and $\theta_m$, the temporal and phase delays associated with an interfering path, vary due to mechanical/thermal effects;
the additive noise n[k] models other sources of noise in the channel;
due to independence of data symbols, A[k], the amplitudes of the victims and interferers are jointly independent;
the $\gamma_m$ models the attenuation of a reflected signal, originating from the return loss of the connectors at which the reflections occur;
The $\psi[m]$ are of the general form $\Sigma_{i=a}{}^b 2\theta_l$, for a,b∈{1,2,3,4,5}

Figure 1:
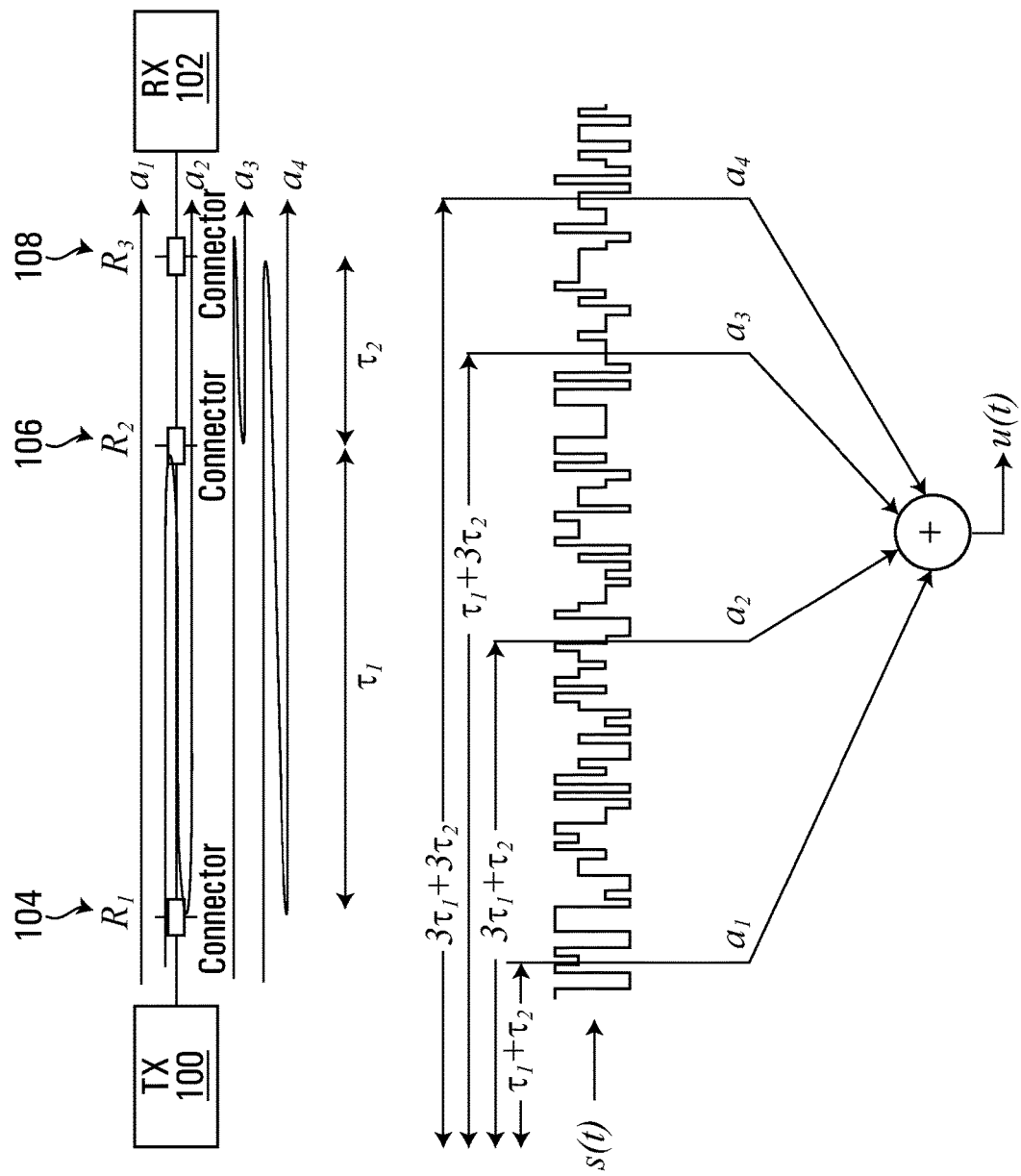
FIG. 1 depicts an optical system and corresponding signal with multi-path interference.
Figure 5A:
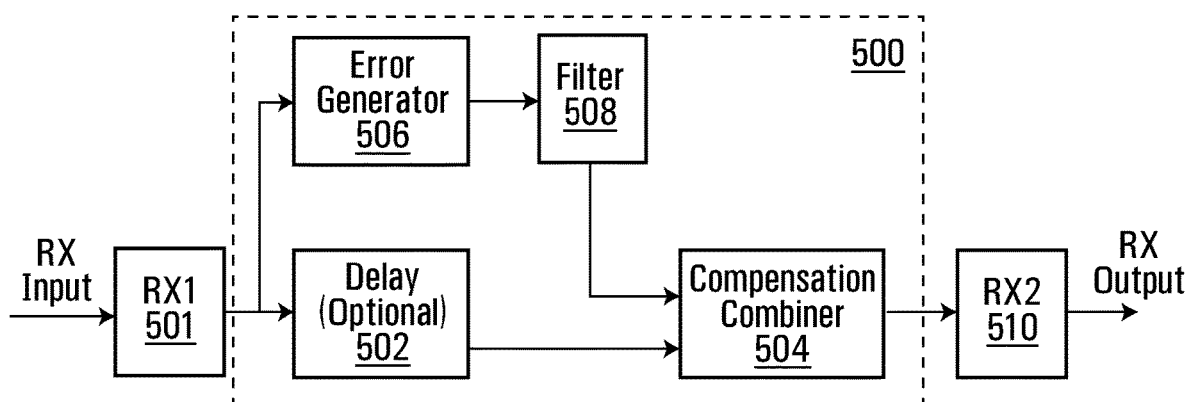
FIG. 5A is a block diagram of an optical receiver having a MPI mitigation circuit.

Referring now to FIG. 5A, shown is a block diagram of an optical receiver including a MPI mitigation circuit 500 provided by an embodiment of invention. Block RX1 501 represents any input signal processing that is performed prior to the MPI mitigation circuit 500. Specific examples are given below. Block RX2 510 represents receive signal processing that is performed after the MPI mitigation circuit 500. Specific examples are given below. The MPI mitigation circuit 500 is implemented in a receiver connected to an optical signal path, such as exemplified in FIGS. 1 to 3.

The MPI-mitigation circuit 500 has an error generator 506 that estimates a PAM level of samples received from RX1 501, and generates a corresponding error signal. The error signal is filtered in low-pass filter 508 to produce estimates of the MPI. A compensation combiner 504 combines the estimates of the MPI with the samples received from RX1 501, optionally after a delay 502 that accounts for the time it takes to process the samples in the error generator 506 and the filter 508.

Figure 5B:
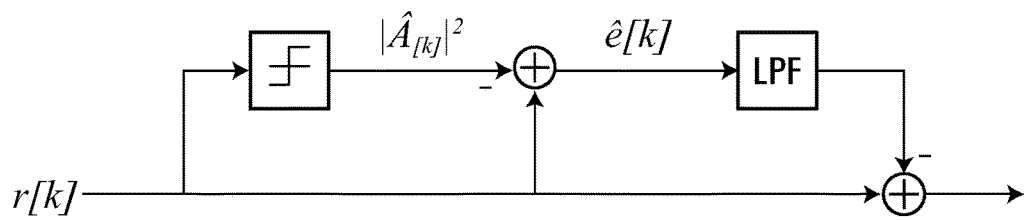
FIG. 5B is a baud rate model of the receiver of FIG. 5A.

FIG. 5B is a baud rate view of the MPI-mitigation circuit 500 of FIG. 5A. Input samples r[k] are sliced in a slicer 522 that, for each sample, estimates a respective PAM level of the sample. A subtractor 524 (a specific example of error generator 506 of FIG. 5A), subtracts the sample from the respective estimated PAM level to generate a corresponding error sample. The error samples are filtered in lowpass filter 526 to produce estimates of MPI which are then subtracted from the input samples r[k] with subtractor 528.

There are many options for the low-pass filter. In some embodiments, the low-pass filter is a fixed block average component that determines an average of the error samples for a block of consecutive samples. The average thus determined is used as the estimate of MPI that is combined with each sample in the block of consecutive samples. In a specific example, the estimate of MPI is determined using a fixed 32-baud window according to:

$$\frac{1}{32}\sum_{k=0}^{31}\hat{e}[k]$$

The approach requires 31 additions per 32 bauds.

In some embodiments, the low-pass filter is a moving window average component that determines, for each sample, an average of the error samples for a respective block of error samples defined by a moving window, wherein the average is used as the estimate of MPI that is combined with the sample. In some embodiments, there is a unique window used for each sample. In other embodiments, the same window is used for a set of consecutive samples that is smaller than the size of the block of error samples. In a specific example, the estimate of MPI is determined using a sliding 32-baud window, with MPI mitigation common over 8 consecutive bauds according to:

$$\frac{1}{32}\sum_{k=0}^{31}\hat{e}[8i-12+k], i \in \{0, 1, 2, 3\}$$

The approach requires >=40 additions per 32 bauds.

In some embodiments, a size of the block of consecutive samples (for fixed or moving window embodiments) is configured as a function of transmitter coherence.

In some embodiments, the compensation combiner 504 is a subtractor that combines the estimate of the component of multi-path interference with the sample to produce an interference-mitigated sample by subtracting the estimate from the sample to produce the interference-mitigated sample.

In some embodiments, the compensation combiner 504 is a level-dependent subtractor that produces a weighted estimate by multiplying the estimate of MPI output by the filter by a value proportional to a respective PAM level modulating the E-field estimated from the sample. This weighted estimate is then subtracted from the sample to produce the interference-mitigated sample. The PAM level modulating the E-field is to be distinguished from the output of a direct detector (for example slicer 522), in that the PAM levels after direct detection are a function of power, and so are the square of the E-field amplitude.

Figure 6:
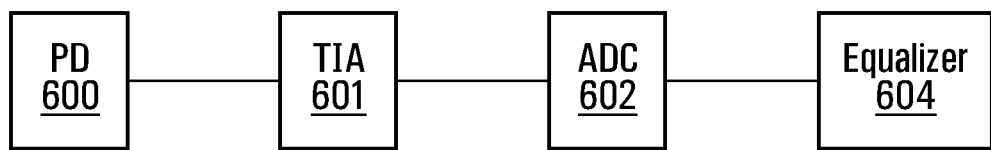
FIG. 6 is a block diagram of an example implementation of the RX1 component of FIG. 5A.

As noted above, RX1 block 501 represents any input signal processing that is performed prior to the feed-forward MPI-mitigation circuit 500. With reference to FIG. 6, in a specific example, this includes at least a direct detection receiver such as a photodiode (PD) 600, a trans-impedance amplifier (TIA) 601 that amplifies the direct detection output, an analog to digital converter (ADC) 602 that performs analog to digital conversion on an output of the TIA to generate raw samples and an equalizer 604 that equalizes the raw samples to produce the plurality of samples. There may be different, or additional functionality in RX1 block 501.

As noted above, RX2 block 510 represents any input signal processing that is performed after the feed-forward MPI-mitigation circuit 500. In some embodiments, this includes a PAM decision slicer that performs PAM decision slicing for each interference-mitigated sample. There may be additional functionality in RX2 block 510.

Figure 7:
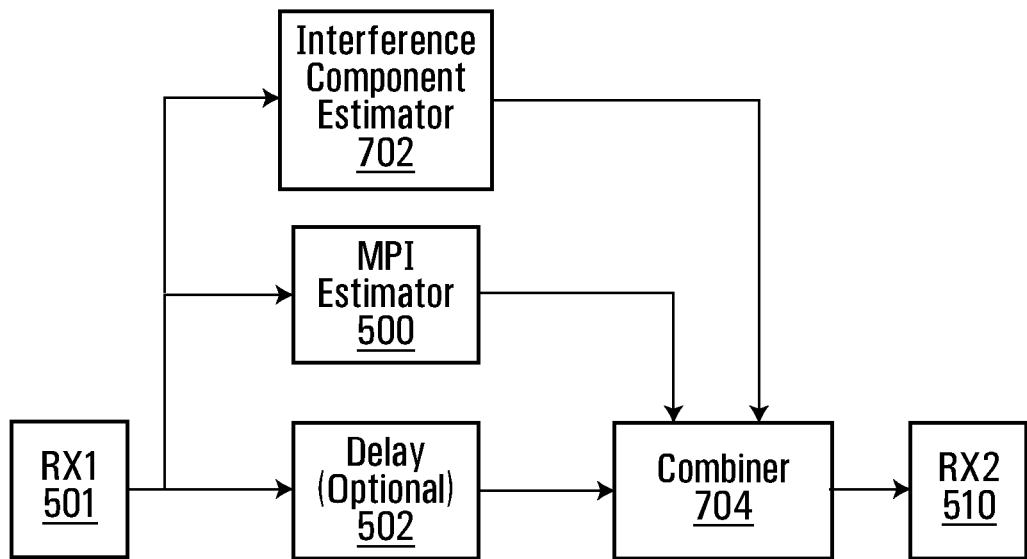
FIG. 7 is a block diagram of an optical receiver having a MPI mitigation circuit and interference component estimator.

Another interference mitigation circuit provided by an embodiment of the invention will now be described with reference to FIG. 7, which includes many components in common with FIG. 5A. The circuit additionally includes an interference component estimator 702, and a combiner 704 that receives an output of the MPI estimator 500 and one or more outputs of the interference component estimator 702.

The interference component estimator 702 estimates at least one interference component by estimating a respective delay and respective amplitude for each interference component. Typically, the interference component estimator will estimate components due to electrical reflections. Because the electrical reflections typically occur over very short distances (on the order of tens of mm or less), they remain within a small number of bauds from the main signal. The combiner 705 combines the estimate of MPI and the estimated at least one electrical interference component 702 with the sample to produce interference mitigated samples that are passed on to RX2 block 510.

Figure 8:
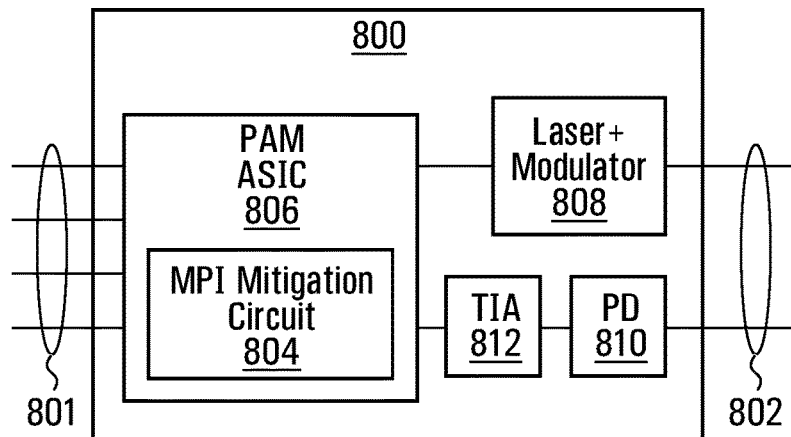
FIG. 8 is a block diagram of an optical module having an MPI mitigation circuit.

With reference to FIG. 8, another embodiment of the invention provides an optical module. The optical module has an optical IO (input/output) 802 and an electrical IO 804. In respect of an optical signal received at the optical I/O, there is a photo-diode (PD) 810 for performing direct detection to produce a direct detection output. The direct detection output is amplified in a TIA 812. There is a PAM ASIC 806 configured to perform PAM demodulation on an output of the TIA 812 to produce a signal at the electrical IO 804. The PAM ASIC includes an MPI mitigation circuit 804 that implements MPI mitigation in accordance with one of the embodiments described herein. The PAM ASIC may, for example, include the circuit of FIG. 6.

In respect of signals received at the electrical IO 804, the PAM ASIC is further configured to perform PAM modulation based on an incoming electrical signal. The optical module also has a laser plus modulator 808 that outputs an optical signal at the optical IO having a PAM modulated E-field based on the output of the PAM modulation.

Figure 9:
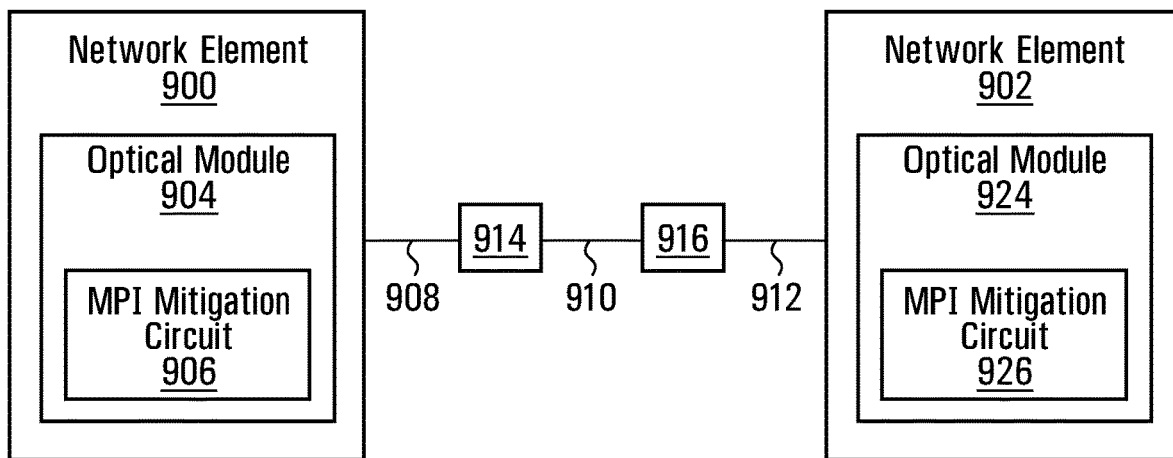
FIG. 9 is a block diagram of an optical network including network elements with MPI mitigation circuits.

Referring now to FIG. 9 shown is a block diagram of an optical communications system provided by an embodiment of the invention. The system includes a number of network elements 900,902 (only two shown, but there typically will be more). The network elements 902,904 may be switches, routers, servers for example. The network elements 902,904 are interconnected by optical paths that comprise optical fiber and optical interfaces. In the specific example illustrated, network elements 902,904 are interconnected by an optical path that includes optical fiber 908, interface 914, optical fiber 910, interface 916, and optical fiber 912. The number of fibers and interfaces is implementation specific. In addition, at least one of the network elements includes an optical module having an MPI-mitigation circuit in accordance with one of the embodiments described herein. In the illustrated example, network elements 900,902 include respective optical modules 904,924 that include respective MPI mitigation circuits 906,926. In some embodiments, the optical modules are in accordance with the example of FIG. 8.

The specific operating frequencies, in terms of baud rate of the incoming signals, and the passband of the low-pass filter, are implementation specific. In some embodiments, the systems and methods described herein are applied for optical signals having a baud rate that is greater than 25 GBaud, and the MPI mitigation circuit performs low-pass filtering to remove MPI below frequencies of 100 MHz in some embodiments, and below 10 MHz in other embodiments.

Figure 10:
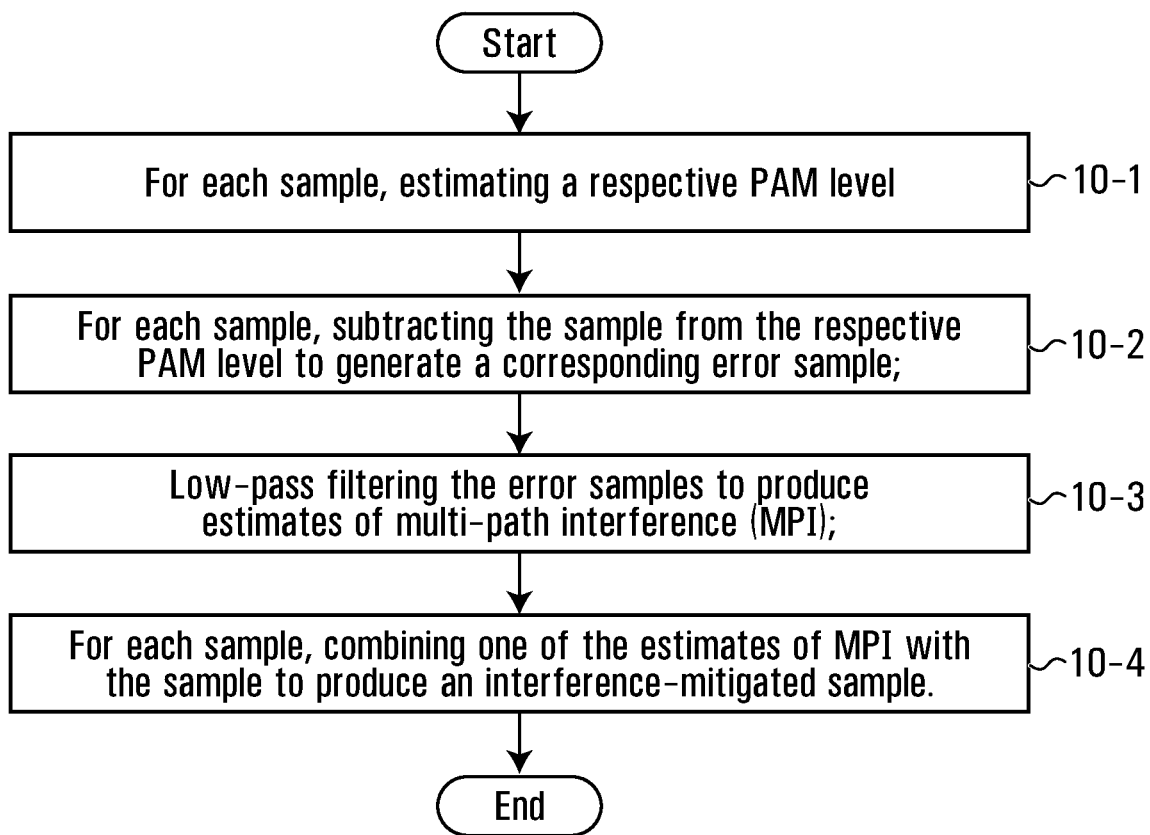
FIG. 10 is a flowchart of a method of performing MPI mitigation.

FIG. 10 is flowchart of a method of processing a plurality of samples of an optical signal having a pulse amplitude modulated (PAM) E-field. In block 10-1, for each sample, a respective PAM level is estimated. In block 10-2, for each sample, the sample is subtracted from the respective PAM level to generate a corresponding error sample. In block 10-3, the error samples are low-pass filtered to produce estimates of multi-path interference (MPI). In block 10-4, for each sample, one of the estimates of MPI is combined with the sample to produce an interference-mitigated sample. Various examples of how these steps can be performed have been described above.

Numerous modifications and variations of the present disclosure are possible in light of the above teachings. It is therefore to be understood that within the scope of the appended claims, the disclosure may be practiced otherwise than as specifically described herein.

The invention claimed is:

1. A circuit configured to receive a plurality of samples of an optical signal having a pulse amplitude modulated (PAM) E-field; the circuit comprising:
   a slicer configured to estimate a PAM level of a sample in the plurality of samples;
   a subtractor configured to generate an error sample by subtracting the sample from the estimated PAM level;
   a low-pass filter configured to filter the error sample for the sample and error samples for the other samples in the plurality of samples to produce estimates of multi-path interference (MPI); and
   a combiner configured to produce an interference-mitigated sample by combining one of the estimates of MPI with the sample.

2. The circuit of claim 1 wherein the subtractor is a first subtractor configured to subtract the sample from the estimated PAM level to generate a corresponding error sample.

3. The circuit of claim 1 wherein:
   the subtractor is a first subtractor; and
   the combiner is a second subtractor that is configured to combine the one of the estimates of multi-path interference with the sample to produce the interference-mitigated sample by subtracting the one of the estimates of MPI from the sample to produce the interference-mitigated sample.

4. The circuit of claim 1 wherein:
the subtractor is a first subtractor; and
the combiner is second, level-dependent subtractor that, for a given sample, is configured to combine the one of the estimates of MPI with the sample to produce the interference-mitigated sample by producing a weighted estimate by multiplying the one of the estimates of MPI producing the weighted estimate by multiplying the one of the estimates of MH with a value proportional to a respective PAM level modulating the E-field estimated from the sample, and subtracting the weighted estimate from the sample to produce the interference mitigated sample.

5. The circuit of claim 4 wherein the first subtractor is configured to subtract the sample from the estimated PAM level to generate a corresponding error sample.

6. The circuit of claim 1 wherein the low-pass filter comprises:
a fixed block average component configured to determine an average of the error samples for a block of samples, wherein the average is used as the one of the estimates of MPI that is combined with each sample in the block of samples.

7. The circuit of claim 6 wherein the block of samples comprises consecutive samples.

8. The circuit of claim 7 wherein a size of the block of samples comprising the consecutive samples is configured as a function of transmitter coherence.

9. The circuit of claim 1 wherein the low-pass filter comprises:
a moving window average component configured to determine, for each sample, an average of the error samples for a respective block of error samples defined by a moving window, wherein the average is used as the one of the estimates MPI that is combined with the sample.

10. The circuit of claim 9 wherein the block of error samples comprises consecutive samples.

11. The circuit of claim 10 wherein a size of the block of error samples comprising the consecutive samples is configured as a function of transmitter coherence.

12. The circuit of claim 1 operating at a baud rate of greater than 25 GBaud, in which the low-pass filter operates to filter frequencies below 100 MHz.

13. The circuit of claim 1 operating at a baud rate of greater than 25 GBaud, in which the low-pass filter operates to filter frequencies below 10 MHz.

14. The circuit of claim 1 further comprising:
a delay element configured to delay the sample before combining to account for a delay in determining the one of the estimates of MPI.

15. The circuit of claim 1 further comprising:
a direct detection receiver configured to directly detect the optical signal to produce a direct detection output.

16. The circuit of claim 15 further comprising:
a converter configured to perform analog to digital conversion on the direct detection output to generate raw samples.

17. The circuit of claim 16 further comprising:
an equalizer configured to equalize the raw samples to produce the plurality of samples.

18. The circuit of claim 17 further comprising:
a PAM decision slicer configured to perform PAM decision slicing for each interference-mitigated sample.

19. The circuit of claim 1 further comprising:
an interference component estimator configured to estimate at least one interference component by estimating a respective delay and respective amplitude for each interference component;
wherein for each sample, the combiner is configured to combine the one of the estimates of MPI and the estimated at least one interference component with the sample; and
a PAM decision slicer configured to perform PAM decision slicing for each interference-mitigated sample.

20. The circuit of claim 1 further comprising:
a PAM decision slicer configured to perform PAM decision slicing for each interference-mitigated sample.

* * * * *